United States Patent [19]
Theobald

[11] 3,721,913
[45] March 20, 1973

[54] DC TO SUB-MICROSECOND FREQUENCY CHANGE DETECTOR

[75] Inventor: Donald J. Theobald, Lajolla, Calif.

[73] Assignee: The United States of America as represented by the Secretary of the Navy

[22] Filed: Sept. 2, 1971

[21] Appl. No.: 177,295

[52] U.S. Cl. ................329/102, 307/233, 329/104, 329/137, 329/192
[51] Int. Cl. ......................H04l 27/22, H04k 9/00
[58] Field of Search......329/110, 104, 102, 103, 192, 329/137, 138; 325/320; 178/66, 67, 68; 307/233

[56] References Cited

UNITED STATES PATENTS

| | | | |
|---|---|---|---|
| 2,961,613 | 11/1960 | Eschner | 329/137 |
| 3,054,064 | 9/1962 | Sherman | 329/137 |
| 3,386,041 | 5/1968 | Bell | 329/102 |
| 3,471,792 | 10/1969 | Axford | 329/192 |
| 3,482,173 | 12/1969 | Hilbert | 328/133 X |
| 3,569,845 | 3/1971 | Steinberg | 329/110 |

*Primary Examiner*—Alfred L. Brody
*Attorney*—R. S. Sciascia et al.

[57] ABSTRACT

An input network phase shifts received signals by substantially 180° and also attenuates received signals as a function of the frequency. A summing circuit receives the phase shifted signal as well as the unaltered received signal, to develop signals as a function of the instantaneous difference in amplitude between them. The summing circuit includes a constant current sink connecting it to ground and a constant voltage device connecting the low potential side of the summing circuit to the low potential side of the unaltered received signals as a reference. In its preferred embodiment the frequency change detector is capable of detecting such frequency changes within one cycle of the received signals for frequencies ranging from dc to the multi-MHz range.

10 Claims, 6 Drawing Figures

INVENTOR.
DONALD J. THEOBALD

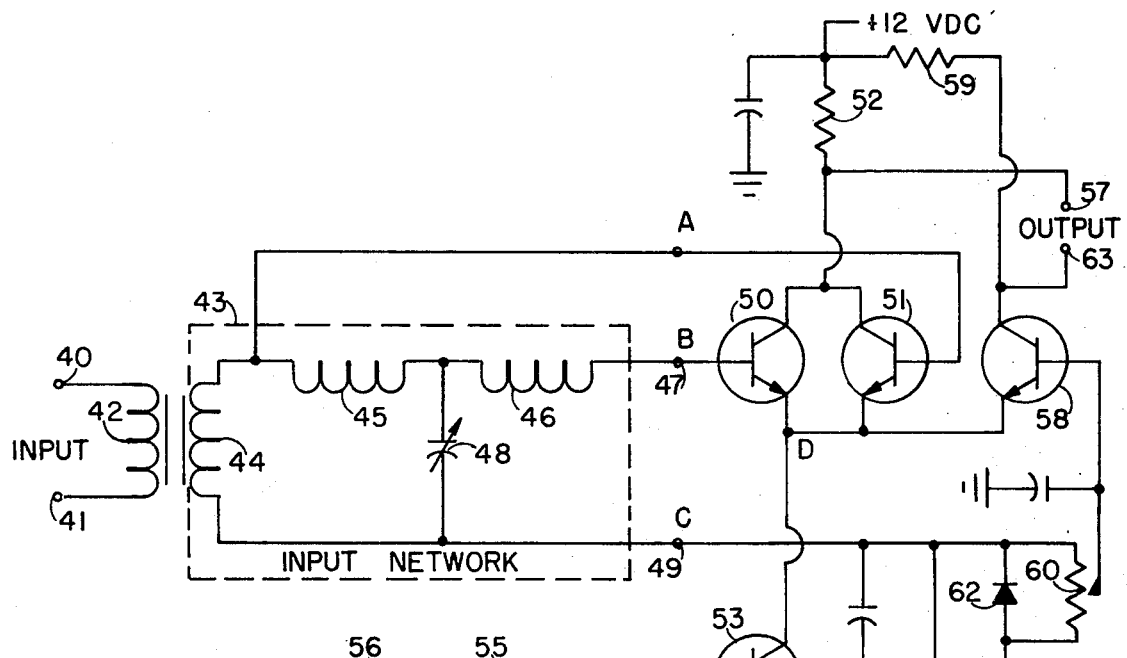
FIG. 3
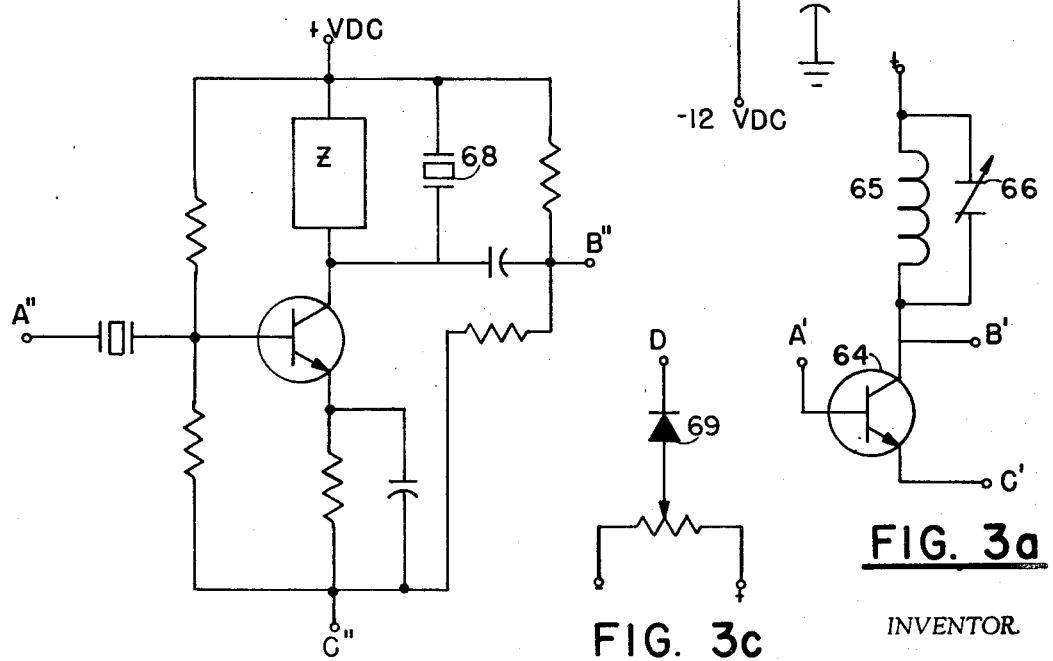
FIG. 3b
FIG. 3c
FIG. 3a
INVENTOR.
BY DONALD J. THEOBALD

DC TO SUB-MICROSECOND FREQUENCY CHANGE DETECTOR

CROSS REFERENCES TO RELATED APPLICATIONS

The subject matter of the present invention is generally related to and useful in connection with the type of system disclosed in patent application Ser. No. 179,386, filed Sept. 10, 1971, in the name of applicant and titled "A High Volume, Serial Binary Data Transmission System".

BACKGROUND OF THE INVENTION

Among the prior art methods previously used to detect changes in frequency the most commonly employed are the ratio detector, the discriminator, and the quadrature detector. Though highly effective and satisfactory in many applications, all three of the mentioned methods of detecting changes in frequency have rather severe limitations as to the maximum rate of change in a carrier frequency which may be accurately and reliably detected in a data transmission system, for example. For instance when binary data is transmitted by means of different carrier frequencies which signify either a binary "1" or a binary "0", the data rate may very readily be in the MHz range in order to give effect to high speed transmission of binary digitally coded information. Such may be the case where peripheral equipment feeds binary digital information to a central computer or data processing equipment, or where binary digital data is received by or transmitted from a display console, for example.

All three of the previously mentioned prior art methods of detecting changes in frequency i.e., the ratio detector, the discriminator, and the quadrature detector are incapable of accurately and reliably detecting changes in frequency at rates higher than the modest Khz range, for example. Since a high speed binary digital data transmission system of the serial type may be required to transmit data at rates far in excess of the lower Khz range, such prior art frequency detector circuits are not practical for use in the detection of changes in carrier frequencies which represent binary data information in such high speed data transmission systems.

Moreover, several prior art frequency detection circuits and methods required demodulated output integration to remove the carrier frequency signal and additionally are relatively complex in their concept and nature.

Accordingly, it is highly desirable that a frequency change detector be provided which can operate reliably and effectively at high data rates and which is capable of detecting changes of carrier frequency within one cycle of relatively very high frequency carrier signals. It is also highly desirable that such a detector be simple in concept and implementation, as well as highly reliable in its operation.

SUMMARY OF THE INVENTION

The present invention conceives the reception of a signal which contains information in the form of shifting carrier frequency signals representing binary digital data. As the carrier frequency changes from one to another frequency it must be rapidly detected to accommodate high data rates. In accordance with the concept of the present invention this end is achieved by providing an input network which has input and output terminals. The input network is characterized in that it will operate upon a received input signal to change it so that the commensurate output signal is phase shifted by substantially 180° with respect to the received input signal and is also attenuated as a function of the frequency of the received input signal. Both the unaltered received input signal and the output of the input network, phase shifted and attenuated as previously described, are connected as the two inputs to a summing circuit. The summing circuit is characterized by being capable of algebraically summing its two received signals which, because one signal is substantially the same as the other signal, but 180° phase shifted, devolves primarily into a signal cancellation operation.

The summing circuit of the present invention also has a constant current sink connecting it to ground potential and, in addition, a constant voltage device connecting the low potential side of the summing circuit to the low potential side of the received input signal as a reference potential.

Both the constant current sink and the constant voltage device are preferably adjustable. The adjustability of the constant current sink affords a means for selectively adjusting the dc operating point of the summing circuit in the absence of a received input signal. Adjustability of the constant voltage device affords a means of selectively varying the operation of the summing circuit to a selected desirable threshold of the summing circuit operation for producing a dc output which changes as a function of detected changes in carrier frequencies.

The concept and implementation of the present invention is relatively simple as contrasted to some prior art frequency detector circuits. Additionally, the present invention is capable of detecting extremely high rates of change in carrier frequencies and may be readily implemented in a variety of forms to suit particular applications and needs.

Accordingly, it is a primary object of the present invention to provide a method and apparatus for detecting extremely high rates of change carrier frequencies.

It is an equally important object of the present invention to provide for the detection of a change in frequency within the time period of a single cycle of the carrier frequency.

Yet another concomitant and most important object of the present invention is to provide for the detection of such high speed changes in carrier frequency without the need for highly complex circuits or equipment.

A further object of the present invention is to provide such a frequency change detector which is readily adaptable for use with binary digital system and which may also be conveniently implemented through the use of integrate circuits.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWINGS

In the drawings:

FIG. 3 is a schematic diagram of a preferred embodiment of the present invention; and FIGS. 3a, 3b and 3c are schematic diagrams of circuits which may be substituted in the embodiments of FIG. 3.

DESCRIPTION OF THE PREFERRED EMBODIMENT

Figure 1:
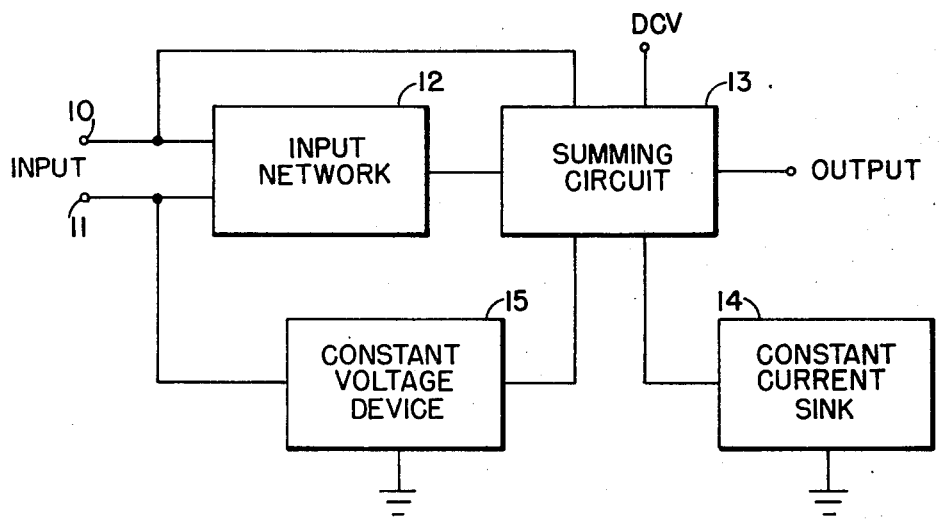
FIG. 1 is a schematic block diagram of the present invention.

In FIG. 1 an input signal is connected across terminals 10 and 11 and is received by an input network 12. The input network 12 is characterized by the capability of phase shifting the received input signal by substantially 180°, and also having an attenuation characteristic which varies as a function of frequency of the received input signal.

The received input signal is also connected to a summing circuit 13 as shown by the connection from the input terminal 10 to the summing circuit 13. The summing circuit 13 is in turn connected to a constant current sink 14 and a constant voltage device 15 which is referenced to the potential of the input signal by connection to the input terminal 11.

In operation, the received input signal developed across the input terminals 10 and 11 is shifted 180° in phase and then connected to the summing circuit 13 as one of its two input signals. The second input to the summing circuit 13 is the unaltered received input signal as connected directly from input terminal 10. The summing circuit 13 performs the function of algebraically summing its two inputs. Since one of the two inputs is substantially 180° out of phase with the other of its two inputs and of the same frequency, there is a cancellation function which takes place. However, the input network 12 also has the operative function of attenuating the input signal received at channel 10 by an attenuation factor which varies as a function of frequency; therefore, the output of the input network 12 which is connected as one of the inputs to the summing circuit 13, is attenuated by some degree and there is a consequent difference in amplitude between the originally unaltered signal received by the summing circuit 13, and the 180° phase shifted and attenuated input which the summing circuit 13 receives from the input network 12.

The summing circuit 13 performs the operation of producing an output which is a function of the algebraic sum of the instantaneous signals which it receives. It therefore produces an output which is representative of the difference between the unaltered received signal connected from input terminal 10 and the 180° phase shifted and attenuated signal which the summing circuit 13 receives from the input network 12. This operation provides virtual cancellation of the carrier signal and the generation of an output signal by summing circuit 13 which is essentially dc in character and varies as a function of the frequency of the received input signals impressed across the input terminals 10 and 11. Accordingly, when there is a change in frequency of the received input signals, a change in amplitude of the output produced by the summing circuit is developed in immediate response.

The constant current sink 14 is arranged to be adjustable so that it affords a means of selectively adjusting the "quiescent" or dc operative point of the summing circuit 13 in the absence of input signals. The constant voltage device 15, which is referenced to the low potential side of the received input signal by connection with input terminal 11, affords a means of selectively adjusting the threshold at which a discernible output will be developed at the output terminal of summing circuit 13 in response to input signals of known and determinable amplitude impressed upon input terminals 10 and 11.

Figure 2:
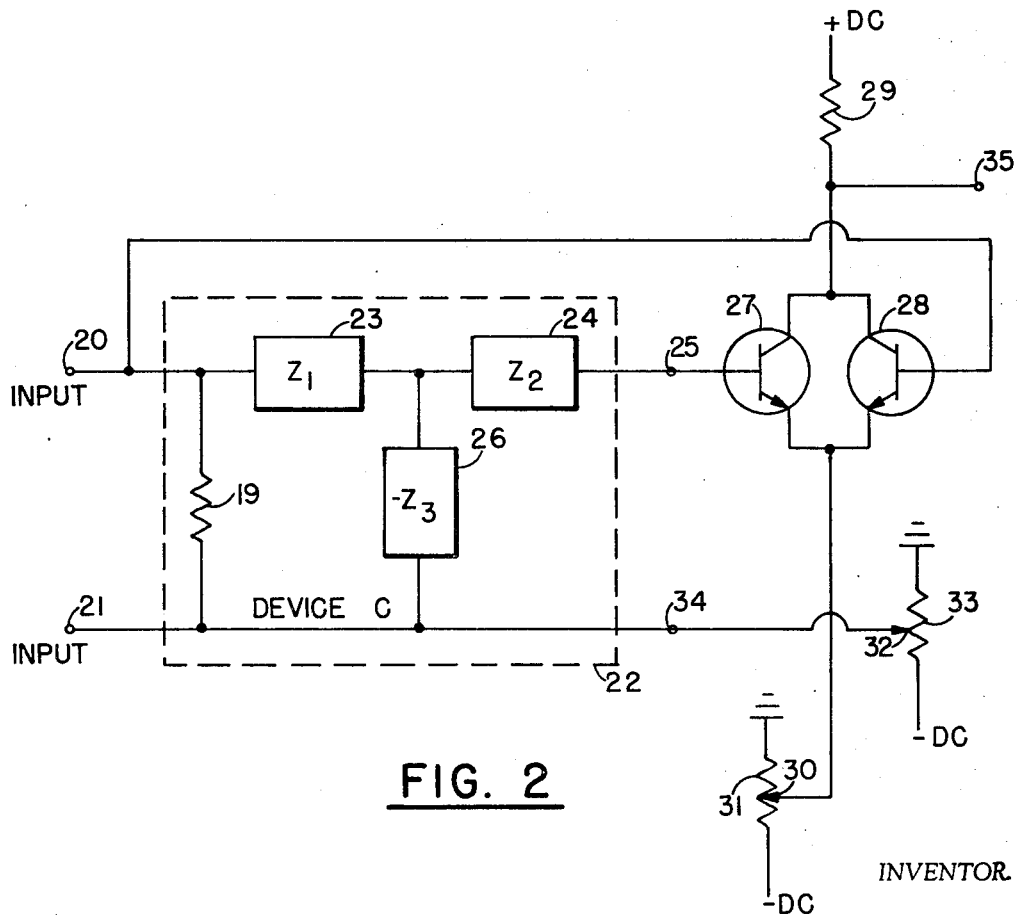
FIG. 2 is a schematic diagram illustrating the embodiment of FIG. 1 in somewhat more detail.

FIG. 2 illustrates in more detail an embodiment of the present invention which may be advantageously implemented by appropriate integrated circuits. A received input signal, such as a carrier wave in a data transmission system having two different frequencies representative of two different binary states for the transmission of digital data information is received at terminals 20 and 21. An input network 22 is illustrated as comprising first and second impedances 23 and 24 connected in series between the input terminal 20 and an output terminal 25 of the input network 22. A third impedance 26 is connected from the series connection between impedances 23 and 24, and to the other side of the input terminals as represented by terminal 21. A resistive element 19 is also connected across the input terminals 20 and 21.

The outputs of the input network re connected to a summing circuit which comprises transistors 27 and 28. The respective collectors of the transistors 27 and 28 have a common junction which connects through a resistance 29 to a source of positive dc potential. The emitters of transistors 27 and 28 have a common connection which is illustrated as being in turn connected to the variable tap 30 of a resistance 31 connected between a source of negative dc potential and ground potential for maintaining a substantially constant current flow. The common emitter junction of the transistors 27 and 28 is also connected to the variable tap 32 of a resistance 33. The resistance 33, in turn, is connected between a source of negative dc potential and ground potential as well as being referenced to the low potential side of the received input signals by reason of connection through the output terminal 34 of the input network 22. This latter arrangement provides a constant voltage which is referenced to the low potential side of the received input signal.

The summing circuit comprising transistors 27 and 28 receives first and second inputs. The first signal input may comprise the unaltered received input signals as connected from input terminal 20 directly to the base of transistor 28. The second signal input may comprise the 180° phase shifted and attenuated input signal as derived from the output terminal 25 of the input network 22 and connected to the base of transistor 27. Since the first and second signals impressed upon the summing circuit are substantially 180° out of phase and of different amplitudes due to the attenuation of one of the signals by its passage through the input network 22, the resultant output developed at the terminal 35 is the result of a partial cancellation with the output signal having an amplitude representative of the difference in amplitude of the two signals received at the respective bases of the transistors 27 and 28. However, since the received input signal is attenuated by passing through the input network in a degree which is a function of the frequency of that signal, the amplitude of the signal developed at output terminal 25 of the input network 22 will vary as a function of its frequency. The input signal received at input terminal 20, however, is essentially constant in amplitude as may be assured, for example, by an appropriate limiter circuit. Therefore, with the amplitude of the signal impressed upon the base of transistor 27 varying as a function of frequency, and the amplitude of the signal impressed upon the base of the transistor 28 being essentially constant, there is a resultant variation in the difference signal developed at terminal 35 as a function of the frequency of the input signal received across input terminals 20 and 21.

THe extremely high speed response of the present invention produces a difference in amplitude of output signal developed at output terminal 35 within less than one periodic cycle of the frequency of the initially received input signal, obviates the common requirement in more conventional detector circuits for integration over a multi-cyclic period of time. Moreover, the frequency change detector of the present invention is designed for application such as the detection in changes of carrier frequency denoting different binary states for the transmission of digital data, so that it is the change in frequency and the development of an appropriate signal responsive thereto which is its most important operative function.

FIG. 3 illustrates a preferred embodiment of the present invention which employs its concepts in a highly desirable manner. The input signal is received at input terminals 40 and 41 which are connected across the primary coil 42 of a transformer 43. The secondary coils 44 on the transformer 43 are connected to an input network which may take the form of a low pass, constant K filter. In the illustration of FIG. 3 the input network also comprises inductances 45 and 46 connected in series to one of the two output terminals 47 of the input network. A variable capacitance 48 is connected in the input network from the common connection of the inductances 45 and 46 to the other side of the secondary coil 44 of the transformer 43 and also constitutes a common connection to the other output terminal 49 of the input network.

A summing circuit comprised primarily of transistors 50 and 51 is connected to receive first and second signals and produce an essentially dc output as a function of the instantaneous difference in amplitude between its input signals. Transistors 50 and 51 have common collector connections and common emitter connections. The common collector junction of transistors 50 and 51 is connected through a resistive element 52 to an appropriate source of positive dc potential.

The common emitter junction of transistors 50 and 51 is connected to the collector of transistor 53 which has its emitter connected to a source of negative dc potential. The base of transistor 53 is connected to the common junction of the base and collector of a transistor 54. The emitter of transistor 54, is connected in a common junction with the emitter of transistor 53 to the aforementioned source of negative potential dc. The common junction of the base for transistor 53, the collector of transistor 54, and the base of transistor 54 are connected through a fixed resistor 55 and a variable resistance 56 to ground. Because of the common connection between the base and collector of transistor 54, it operates essentially in the manner of a diode, and the transistors 53 and 54 with their associated network elements function as a constant current sink to provide a constant current flow from the emitters of transistors 50 and 51, comprising the summing circuit, to ground which current flow is selectively adjustable by adjustment of the variable resistor 56.

The summing circuit, comprising transistors 50 and 51, is connected to receive the unaltered input signal at the base of transistor 51 such signal being that developed by the secondary coil of 44 of the input transformer 43. The second signal impressed upon the summing circuit is that which is attenuated and phase shifted by the input network comprising inductances 45 and 46 and a variable capacitance 48 for developing a substantially 180° phase shifted signal which is attenuated as a function of its frequency and is connected from the upper terminal 47 of the input network to the base of the transformer 50.

Accordingly, the two signals which are impressed upon the summing circuit are displaced 180° in phase and are of different amplitude because of the attenuation undergone by one of the signals in the input network. Transistors 50 and 51 perform an algebraic summing operation, and consequently the output which they cooperatively develop is a partial cancellation between the two input signals, producing a resultant signal representative of the difference in amplitude of the two input signals. Since the amplitude of the signal impressed upon the base of the transistor 50 varies in amplitude in accordance with frequency as a result of variation in attenuation as a function of frequency, in response to the requisite operative characteristic of the input network, the resultant difference signal developed at the common collector circuit of transistors 50 and 51 will have an amplitude which varies as a function of the changes in frequency. Such output is realized at the output terminal 57 which is connected to the common collector junction of transistors 50 and 51.

In accordance with the concept of the present invention, a constant voltage device is required to be connected in circuit with the common emitter junction of transistors 50 and 51 and also to be referenced to the input signal. In the embodiment illustrated in FIG. 3, the transistor 58 together with its associated circuit elements, comprises such a constant voltage device. The emitter of transistor 58 is connected to the common emitter junction of transistors 50 and 51, while its collector is connected through an appropriate resistance 59 to a suitable source of positive dc potential. The base of transistor 58 is connected to a variable resistance 60 which is, in turn, connected on one side through a resistance 61 to ground and, on its other side, to a source of negative dc potential, as well as to the low potential side of the received input signals as developed at the output terminal 49 of the input network.

A diode 62 may be connected in parallel with the variable resistance 60 for improved stability of operation. Variation of the potential tapped by the setting of the variable resistor 60 enables the selective adjustment of the detection threshold relative to the amplitude of the received input signals.

In the embodiment of FIG. 3, the collector of transistor 58 also develops an output at terminal 63 which has an opposite sense relative to that developed by the common collector junction of transistors 50 and 51. Accordingly, a differential output is generated across terminals 57 and 63 as a function of the instantaneous frequency of the input signals impressed upon the circuit at input terminals 40 and 41.

The input network required in accordance with the concept of the present invention may be of any suitable configuration, need only have the properties of producing a substantially 180° phase shift and have an attenuation characteristic which produces an amplitude in the 180° phase shifted signal attenuated as a function of its frequency. For example, as shown in FIG. 3a, an amplifier comprising transistor 64 having its collector connected to a tank circuit comprising an inductor 65 and a variable capacitance 66 which, in turn, is connected to an appropriate source of positive dc potential may be connected at its points A', B', and C' to the points A, B, and C as illustrated in FIG. 3.

Alternatively, as illustrated in FIG. 3b, an amplifier stage comprising a transistor 67 having an appropriate crystal filter 68 connected in circuit with its collector and an appropriate source of positive dc potential may be connected at the indicated points A'', B'', and C'' to the points A, B, and C of FIG. 3 to provide the necessary 180° phase shift and attenuation characteristics relative to frequency changes as would be provided by the circuitry shown in FIG. 3a as well as that illustrated in FIG. 3.

Further, the constant voltage source as shown in FIG. 3 may be replaced by the circuitry illustrated in FIG. 3c by disconnecting transistors 53 and 54 and connecting the point designated as D in FIG. 3c to the similarly designated point in FIG. 3. The diode 69 should have a non-linear transfer characteristic to effect the desired performance. Operation may be enhanced, if necessary, by the incision of a zener diode connected in parallel with the resistance of FIG. 3c.

The concept of the present invention and its operation in the embodiment as graphically depicted in FIG. 3 is such that the change in frequency may readily be detected in less than the time period of a single, periodic cycle, even for extremely high frequency signals. Accordingly, the requirement for integration of the output signal, as was necessary in many prior art frequency detectors, is largely obviated. Moreover, such extremely high speed response makes possible the detection of changes in frequency employed to transmit data at a data rate well into the MHz range. By contrast, typical prior art systems for detecting changes in frequency have been limited by reason of their lower response to transmitting data at rates in the lower KHz range.

Accordingly, it may readily be appreciated by those knowledgeable in the data transmission arts, and more particularly the arts directed to the transmission of digital data in binary form, that the present invention affords reliable high speed frequency change detection because of its extremely high speed operation in producing an output responsive to a change in frequency in less than one periodic cycle in the multi MHz range.

Additionally, when compared to prior art methods of detecting frequency changes, it will be evident that the present invention inherently conceives cancellation of the received frequency within the detector circuit without the employment of long time constant integration networks being added at the output. When suitably embodied, the present invention has higher gain and is less complex than prior art methods of detecting changes in frequency. Moreover, it does not inherently require the inclusion of tuned circuits or transformers but is so conceived that such elements may be employed should they be desirable. It should also be noted that the direct current return path, as provided by transistors 50, 51, and 58, may be implemented by other suitable devices which will perform the equivalent function. For example, with appropriate polarity changes of the power sources, transistors 50, 51, 53, and 54 may be PNP transistors or any similar device with sufficient power gain. Transistor 58, however, must have a square law or non-linear base-emitter junction transfer characteristic suitable for modulation detection purposes in order to function in the manner contemplated in accordance with the concept of the present invention as embodied in the apparatus of FIG. 3.

Furthermore, the concept of the present invention is particularly adaptable to the employment of integrated circuitry as is, for example, illustrated by circuitry comprising transistors 53, and 54 in FIG. 3. wherein the transistor 54 is employed essentially as a diode, but is done conveniently so because it is on the same chip as the transistor 53.

Obviously many modifications and variations of the present invention are possible in the light of the above teachings. It is therefore to be understood that within the scope of the appended claims the invention may be practiced otherwise than as specifically described.

What is claimed is:

1. A dc to sub-microsecond frequency change detector comprising:
   an input network having input and output terminals;
   means connected between said terminals for developing output signals having variations in amplitude as a function of the variations in frequency of received input signals and substantially 180° phase shifted relative to said received signals;
   a summing circuit for developing resultant signals as a function of the instantaneous difference in amplitude between first and second signals;
   means connecting said received input signals to said summing circuit as said first signals;
   means connecting said output signals to said summing circuit as said second signals;
   an adjustable constant-current sink connected to said summing circuit; and
   an adjustable constant-voltage device connecting the low potential side of said summing circuit to the low potential side of said received input signals as a reference.

2. A dc to sub-microsecond frequency change detector as claimed in claim 1 wherein the means connected between the input and output terminals of the input network comprises a lowpass, constant K filter.

3. A dc to sub-microsecond frequency change detector as claimed in claim 1 wherein the means connected between the input and output terminals comprises an amplifier having a resonant tank circuit for developing said output signals.

4. A dc to sub-microsecond frequency change detector as claimed in claim 1 wherein the means connected between the input and output terminals comprises a crystal filter tuned to a predetermined frequency.

5. A dc to sub-microsecond frequency change detector as claimed in claim 1 wherein said summing circuit comprises two transistors having common emitter and collector connections.

6. A dc to sub-microsecond frequency change detector as claimed in claim 3 wherein said constant-current device comprises a third transistor having its emitter connected to said common emitter connection of its collector connected in circuit with said common collector connection, and its base connected to a reference potential for developing a differential output across the collector of said third transistor and said common collector connection.

7. A dc to sub-microsecond frequency change detector as claimed in claim 4 wherein said third transistor has a variable tap resistance connected in circuit with its base connection for selectively establishing the detection threshold relative to the amplitude of the inputs.

8. A dc to sub-microsecond frequency change detector as claimed in claim 5 wherein said adjustable constant-current sink is connected in circuit with said common emitter connection for selectively establishing the optimum quiescent operating point of said common collectors relative to the amplitude of the inputs.

9. A dc to sub-microsecond frequency change detector as claimed in claim 6 wherein said adjustable constant-current sink comprises a transistor circuit connected to ground potential through a variable resistive element.

10. A dc to sub-microsecond frequency change detector as claimed in claim 1 wherein said adjustable constant voltage device comprises a source of dc potential, a variable tap resistance connected across said potential and a diode having a non-linear transfer characteristic connected in series between said variable tap and said summing circuit.

* * * * *